United States Patent

[11] 3,610,718

| [72] | Inventor | Henry Deboer<br>Lowell, Mich. |
|---|---|---|
| [21] | Appl. No. | 841,472 |
| [22] | Filed | July 14, 1969 |
| [45] | Patented | Oct. 5, 1971 |
| [73] | Assignee | F. L. Jacobs Co.<br>Detroit, Mich. |

[54] ASH RECEPTACLE FOR AUTOMOBILES
1 Claim, 3 Drawing Figs.

[52] U.S. Cl. ............................................. 312/246,
206/19.5
[51] Int. Cl. ........................................ A47b 67/02,
A47f 5/08, B60n 3/08
[50] Field of Search .................................. 312/246,
341; 206/19.5 E

[56] References Cited
UNITED STATES PATENTS

| 2,334,925 | 11/1943 | Hendricks | 312/246 |
| Re.21,080 | 5/1939 | De Boer | 312/246 |
| 2,372,381 | 3/1945 | Kramer | 206/19.5 A |
| 2,944,865 | 7/1960 | Hammesfahr | 312/241 |
| 3,437,391 | 4/1969 | Middleton | 206/19.5 E |
| 3,460,876 | 8/1969 | De Boer | 312/246 |
| 3,466,107 | 9/1969 | Blake | 312/246 |

FOREIGN PATENTS

| 938,568 | 1963 | Great Britain | 206/19.5 |

*Primary Examiner*—Paul R. Gilliam
*Attorney*—Whittemore, Hulbert & Belknap

ABSTRACT: The structure includes a fixed, stamped or drawn sheet metal ash box or receptacle member, and a diecast cover member slidable thereon which is in general of inverted channellike section, each of whose depending flanges carries on its outer side a rigid nonmetallic frictional guide and skid plate. The plate is riveted or otherwise fixedly applied to the cover flange, and is preferably formed of a thermosetting plastic composition. Each plate carries a pair of horizontally aligned, integrally die-formed skid lugs of quasi-circular convex outline. Such lugs project outwardly of the cover flanges and skid plates to mate slidingly in longitudinal guideway grooves in the fixed ash box sides.

PATENTED OCT 5 1971 3,610,718

INVENTOR.
HENRY DeBOER

BY
ATTORNEYS

ASH RECEPTACLE FOR AUTOMOBILES

CROSS-REFERENCE TO RELATED APPLICATIONS

My copending applications, Ser. No. 841,470, filed July 14, 1969, and Ser. No. 841,471, filed July 14, 1969, both disclose and claim an ash receptacle for a similar purpose, but of a fixed retainer mount and sliding box type, in which nonmetallic frictional guide plates are fixedly mounted to depending flanges of the fixed retainer, the plates presenting skid formations slidably mating in guide grooves of the ash box.

BACKGROUND OF THE INVENTION

1. Field of the Invention

The receptacle structure of the invention finds application is automotive installations, particularly those having recessed means of one sort or another to receive a fixed ash box or receptacle member which is exposed upon sliding retraction of a cover for the box. The improvement is specially adapted to an installation in which it is highly desirable to maintain a very low production and installation cost, yet still consistent with a smooth, stable, rattle-proof and noiseless operation of the unit.

2. Description of the Prior Art

I know of no prior art patents dealing with the particular present improvement.

SUMMARY OF THE INVENTION

The improved automotive ash receptacle is of a very simple and inexpensive nature, and one in which no roller or other moving parts are employed, save of course the receptacle's sliding cover, which is withdrawn for access to the fixed ash box without requiring any manual unlatching operation or the like. Guiding action is exerted on the sides of the cover member through the agency of skid formations formed integrally in a pair of rigid nonmetallic, preferably thermosetting plastic plates, which plates are fixedly mounted to depending flanges on the sliding cover. The skid formations slidingly engage outwardly in mating internal grooves formed on sidewalls of the fixed receptacle or box member. The sliding action of the cover is opposed only sufficiently to obtain a stability permitting the receptacle to remain in fixed relation to the box in a fully or partially withdrawn position upwardly exposing the latter, or as fully closed over the box.

DESCRIPTION OF A PREFERRED EMBODIMENT

Figure 1:
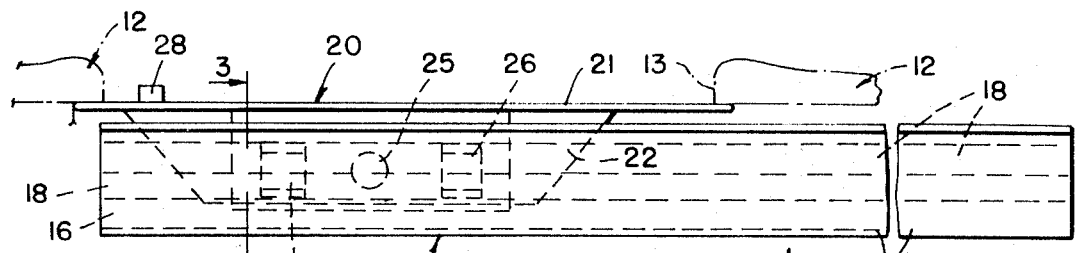
FIG. 1 is a side elevational view of the receptacle structure, showing the fixed ash receptacle or box member as fully closed by the sliding cover, with fixed portions of the vehicle interior bordering a box occupied recess being shown in dot-dash line.

The ash receptacle unit of the invention, generally designated by the reference numeral 10, is depicted in FIG. 1 in a typical setting in an automobile interior in relation to mounting or retainer structure of the interior which will present an appropriate recess for the fixed ash receptacle or box member of unit 10. Typically, such a recess light bar provided beneath a horizontal cushioned or other panel 12 appearing in dot-dash line in FIG. 1, this panel presenting a rectangular opening 13 beneath which the fixed combined retainer and receptacle unit is received. The panel structure 12 may well be that of an area between front bucket seats of the car or, with appropriate alterations as to size and shape, an arm rest or dashboard area of the vehicle. The invention is not concerned with details of this sort.

For the purpose of illustration the unit may be considered to comprise a fixed, elongated stamped mounting or retainer member 14 of rectangular cross section facing upwardly, this retainer having suitable means (not shown) to secure the same beneath the mount's opening 13, extending well beyond one side edge of the opening; and a drawing or stamped receptacle member 15 proper, which is a simple four-wall box construction. Appropriate provision is made, for example, rivets 15' (FIG. 3) engaged by bayonet slots in the bottom of box 15, to enable the latter to be removed for emptying and replaced in a fixed relation to the mount structure 12, in the interest of freedom from possibility of rattling noise.

Figure 2:
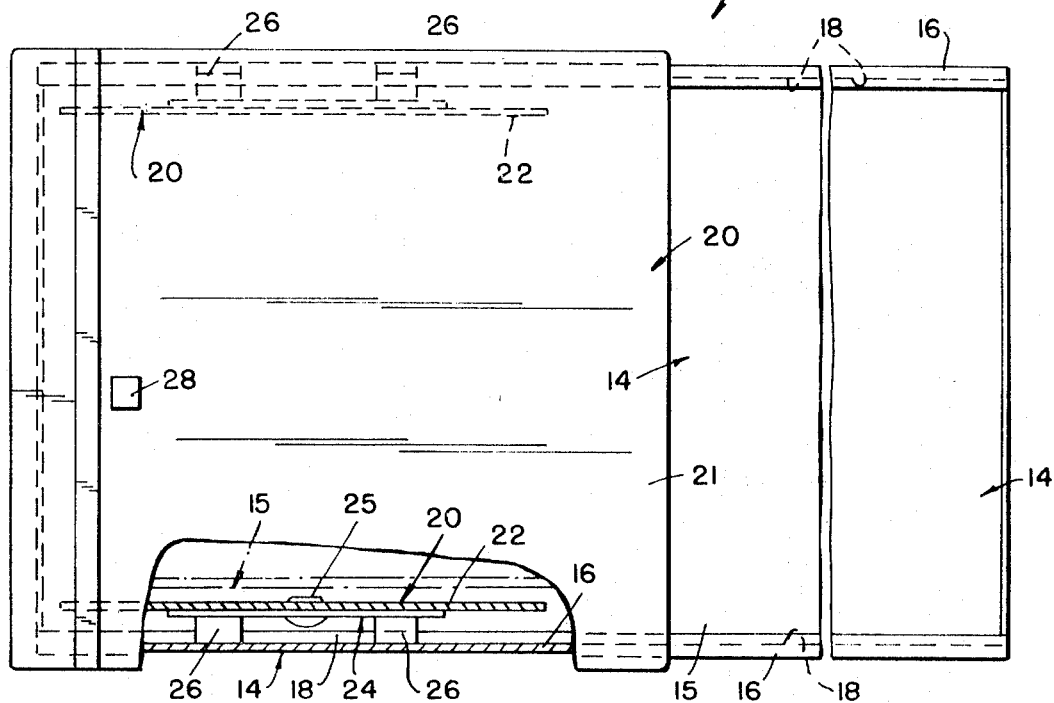
FIG. 2 is a plan view partially broken away and in horizontal section on line 2—2 of FIG. 1.
Figure 3:
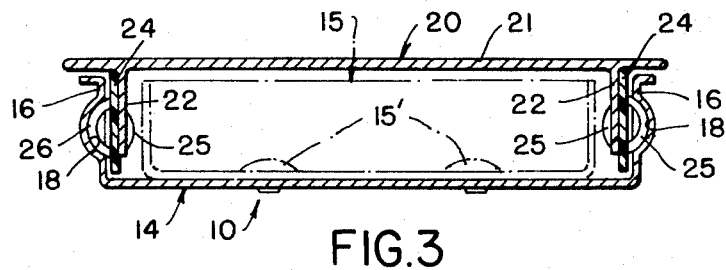
FIG. 3 is a fragmentary view in transverse vertical section on line 3—3 of FIG. 1.

As appears best in FIGS. 2 and 3, the stamped sheet metal retainer 14 presents a bottom panel and parallel upright side flanges, the latter designated 16. These flanges, while physically on the retainer member 14, are to be considered the equivalent of, and effectively part of, the ash box or receptacle member 15 fixedly though removably mounted thereby. Accordingly, this interpretation should be followed in the description and claims to follow.

As appears in FIGS. 1 and 2, the upright side flanges 16 are considerably elongated in nature, and are formed to provide a guideway or groove 18 along the length of each thereof which is outwardly convex in a quasi-spherical cross section, as best shown in FIG. 3.

The sliding cover member 20 of the receptacle 10 is preferably formed by diecasting aluminum or other suitable metal, in contrast to the stamped nature of the compound ash box member 14, 15. Cover member 20 has a flat rectangular top panel 21 of suitable size to overhang and conceal the receptacle side flanges 16 (FIG. 3), and it presents opposed, integral, 90° depending side flanges 22 paralleling one another along the length of cover member 20, these flanges being located well inwardly of the cover side edges. The structure of member 20 is completed by a pair of identical skid plates 24, each fixedly applied, as by a central rivet 25, to the outer side of a cover member flange 22.

The skid plates 24 are of a thermally moldable material, preferably one of a number of known thermosetting plastics, which has a low coefficient of friction; and each of the plates 24 is die-formed at points oppositely equidistant from, and in a horizontal plane including the fastener element 25, thus to provide integral skid elements 26 on the plates. These skid elements or formations, like the formations 18 of the stamped retainer or mounting member 14, are of outwardly convex, quasi-circular cross section; and they have mating sliding engagement in said formations 18.

In assembling the unit 10, with the retainer member 14 secured by appropriate means (not shown) beneath the mount opening 13, the cover member 20 is slid in place from the right, as viewed in FIG. 1, with its top panel 21 sliding beneath mounting structure 12, and with its skid formations 26 frictionally engaging the fixed guideway formations 18 for an antirattle, noiseless action. Cover member panel 21 may be provided with an appropriate upright fingerpiece 28 to facilitate sliding of member 20 to expose the ash box upwardly and recover it.

I claim:

1. An ash receptacle structure comprising a fixed metal receptacle member having a pair of upstanding vertical parallel sidewalls, each of said sidewalls having a guide groove therein extending lengthwise of said structure, a metal cover member movable in a longitudinal sliding path on and relative to said fixed receptacle member between closed and open conditions of said structure, said cover member having a pair of depending vertically extending flanges spaced inwardly from the longitudinal edges thereof and parallel to said sidewalls, the distance between the flanges of said cover member being less than the distance between the sidewalls of said receptacle member whereby said flanges extend into the space between said sidewalls, and means mounting said movable cover member for sliding movement on said fixed receptacle member comprising a pair of separate generally flat skid plates secured to said flanges, one of said skid plates being mounted against the outer surface of one of said flanges opposite one of said guide grooves and the other of said skid plates being mounted against the outer surface of the other of said flanges opposite the other of said guide grooves, each of said skid plates having at least one integral headed skid projection projecting laterally therefrom into the opposite guide groove of the fixed receptacle member, said skid plates and their projections being formed of a relatively rigid nonmetallic plastic material.